March 28, 1939. H. W. ZIMMERMAN 2,151,953
TORQUE MEASURING WRENCH
Filed March 6, 1937
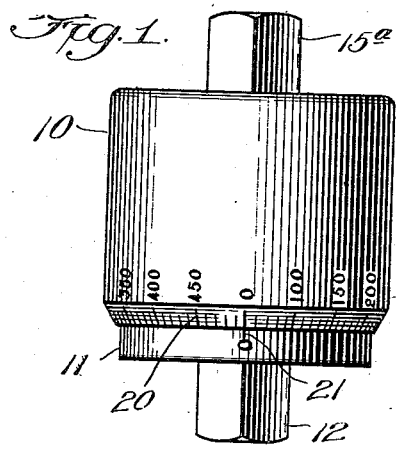
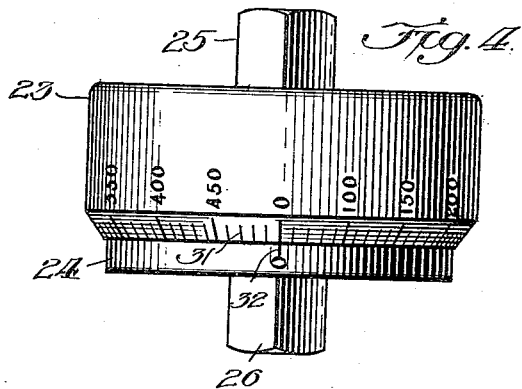
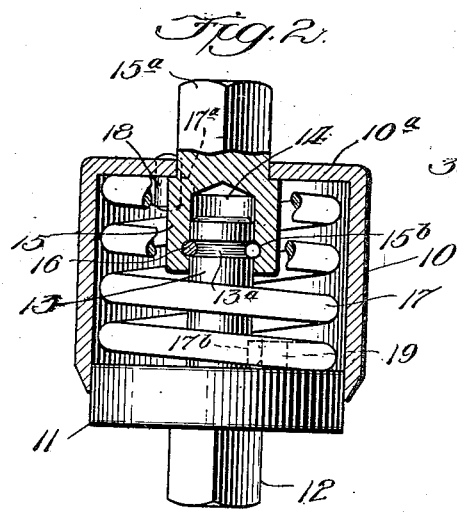
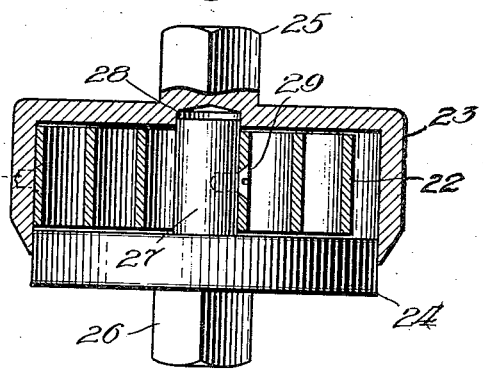
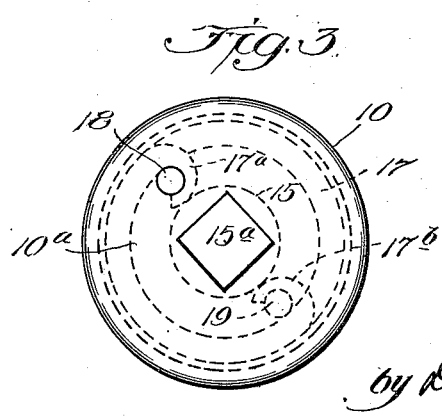
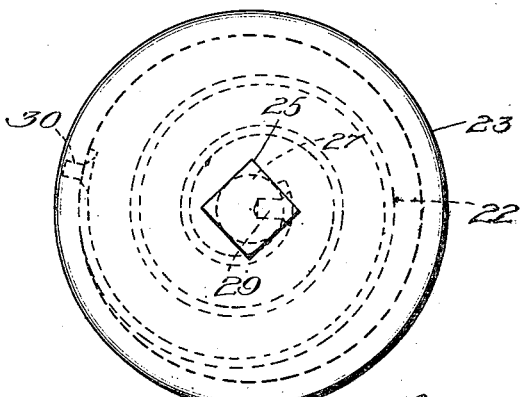
Inventor:
Herman W. Zimmerman
by Davis, Lindsey, Smith & Shonts
Attys.

Patented Mar. 28, 1939

2,151,953

UNITED STATES PATENT OFFICE 2,151,953

TORQUE MEASURING WRENCH

Herman W. Zimmerman, Highland Park, Ill., assignor, by mesne assignments, to Fred G. Wacker and Grace J. Wacker, Lake Forest, Ill.

Application March 6, 1937, Serial No. 129,357

4 Claims. (Cl. 265—1)

My invention relates to wrenches, and it has to do particularly with wrenches adapted for measuring the force or torque applied therethrough in tightening, loosening or otherwise moving nuts, bolts, studs and other devices.

As is well known, the application of excessive pressure to nuts, bolts, studs, etc., in tightening the same will tend to break or twist off, or otherwise distort, the bolt or stud. The amount of force or pressure that may be applied through a wrench in such cases is determined, in part, by the tensile strength of the bolt or stud material and also somewhat by the depth and pitch of the threads thereof. It is, therefore, desirable that some means be provided for indicating the amount of force or torque applied through the wrench in order that the foregoing objectionable condition may be avoided.

Also, it is quite desirable, in many cases where a plurality of studs or bolts are employed in fastening a device, that all of the studs or bolts be tightened in a uniform manner to insure proper functioning of the device. One example of this is the cylinder head of an automotive engine, in which case it has been found that the lack of uniformity in tightening the cylinder head studs results in distortion of the head, which lowers the efficiency of the engine.

Still further, it has been found expedient, in many cases where parts are rotatably fitted together, to determine the nature of the fit between the parts by measuring the initial force or torque required to relatively rotate such parts. One example of this is the fitting of a bearing, such as a crank shaft bearing. Another example is the fitting of a piston pin, wherein it is desirable to fit the parts in such a way that the resistance to relative movement does not exceed a predetermined extent. An additional example is the fitting of a lathe spindle to its supporting bearings.

It will also be appreciated that, in many cases, the bolts, studs, nuts or other devices to be worked upon are located in places where they are not easily accessible, and a problem is presented in using a wrench, and particularly one embodying provision for the measurement of torque. One of the objects of my invention is to provide an improved wrench device that serves the foregoing purposes and by which nuts, bolts, studs and the like may be readily tightened to a predetermined extent and any number of them may be set up successively in a uniform manner.

Another object is to provide a torque measuring device which is capable, through the provision of suitable adapter devices, for the measuring of the force or torque required to move various rotatably mounted devices, such, for example, as crank shafts, lathe spindles, piston and connecting rod mountings, and the like.

A further object is to provide a torque measuring device of the foregoing character which is quite simple in construction and embodies but very few parts that may be readily and easily assembled and disassembled, is so inexpensive that it may readily find its way into automotive and other service stations and work shops of practically all classes, is substantially foolproof in operation, and is adapted to serve the intended purpose in a highly efficient manner at all times.

Still another object is to provide a torque measuring device that may readily be applied to and used in connection with various forms of ordinary non-torque-measuring wrenches, which device may be used as an accessory to an ordinary wrench.

Further objects and advantages will become apparent as this description progresses, and by reference to the drawing, wherein—

Figure 1 is a front elevational view of one form of device embodying my invention;

Fig. 2 is a vertical sectional view of the structure shown in Fig. 1;

Fig. 3 is a top plan view of the structure shown in Figs. 1 and 2;

Fig. 4 is a front elevational view showing another form of device embodying my invention;

Fig. 5 is a vertical section through the structure shown in Fig. 4; and

Fig. 6 is a top plan view of the structure shown in Figs. 4 and 5.

In the drawing, I have shown torque measuring adapter devices that may readily be used as accessories to various well-known forms of wrenches which need not be described in detail herein. These devices are comparatively small and may be used in connection with wrenches adapted for work upon nuts, bolts, studs and the like which are disposed in places that are difficult of access.

The device shown in Figs. 1 to 3, inclusive, includes an outer, inverted, cup-shaped shell 10 and an inner disk member 11 snugly and rotatably fitting in the lower open end portion of the shell 10. The disk 11 is provided with an axial, squared shank 12 depending from its outer face and adapted to engage any suitable and well-known means arranged for engagement with a nut, bolt, stud, or other device, which will be referred to at times as "the work". The disk 11 is also provided, on its inner face, with a cylindrical, axially-disposed shaft-like projection 13, the inward end of which is snugly and rotatably supported within a similarly-shaped opening 14 formed in the inner, shell-disposed end of another shank member 15 projecting outwardly and axially through the shell top 10ª. The outer end 15ª of the shank member 15 is reduced and squared and it projects outwardly through a similarly-shaped opening formed in the top wall 10ª to an extent limited by its enlarged inner end, the arrangement being such that the shell 10 and shank member 15 rotate together as a unit. The disk projection 13 and the shank 15 are locked together for relative rotation without axial displacement by a locking ring 16 engaging complemental, aligned grooves 13ª and 15ᵇ formed in the projection 13 and socket 14, respectively. With this arrangement, relative rotation between the outer shell 10 and the disk 11 may be accomplished by relative rotation of the shank members 12 and 15. The squared portion 15ª of the shank 15 is adapted to be engaged by the jaw of an ordinary wrench or any other suitable adapter means that may be employed between this device and the jaw of the wrench. As will become obvious hereinafter, the device may be inverted so that the shank 12, which is preferably sized and shaped similarly to the shank part 15ª, may be operatively connected to the wrench jaw while the shank 15 is operatively connected to the work.

Relative rotation of the outer shell and disk 11 is opposed by a coil torsion spring 17 mounted within the shell 10 and having its upper end connected to the shell 10 and its lower end connected to the disk 11. The connections referred to include a clockwise-extending hook portion 17ª (as viewed in Fig. 3) on the upper end of the spring 17 which engages a pin 18 carried by and projecting inwardly from the top of the shell 10, and an oppositely extending hook portion 17ᵇ on the other end of the spring which engages a pin 19 projecting upwardly from the inner face of the disk 11.

In tightening a nut, bolt, stud, or the like, the shank 15 is connected with the wrench jaw and is moved in a clockwise direction as viewed in Fig. 3. With the shank 12 and disk 11 operatively connected with the work, the clockwise rotation of the shank 15 and shell 10 tends to wind up, so to speak, the spring 17 and increase its tension. The spring 17 is of such construction that it has a predetermined initial tension; or, in other words, it is so constructed that a predetermined force is required to overcome its initial tension or at-rest condition before any winding effect or increased tension thereof is accomplished. The extent of increase in tension of the spring 17 is indicated by the extent of relative rotation of the shell 10 and disk 11. Certain inch-pounds pressure is required to effect relative rotation of the shell and disk and to increase the tension of the spring 17 to any predetermined extent. In the use of this structure to tighten the work, for example, the spring has such an initial tension that the nut, bolt or stud may be set up to a predetermined point before enough force or torque is applied through the device to overcome the initial tension of the spring 17; and when the work offers such resistance that the torque applied is greater than the initial tension of the spring 17, the shell 10 and disk 11 rotate relatively, increasing the tension of spring 17 to a point wherein the resistance offered by the work is overcome and the work is further tightened. This action is continued until the work is tightened to the desired extent, and the extent of relative rotation of the shell 10 and disk 11 indicates the extent of increase in tension of the spring 17 and the amount of torque applied through the wrench in setting up or tightening the particular work.

In order that the operator may readily determine the amount of force or torque applied to the work to avoid breakage or to effect uniformity in tightening the same, I provide an indicating means. This indicating means includes a scale 20 on the lower outer edge of the outer shell 10, the scale-bearing surface being beveled to provide a very thin shell edge located in close proximity to the outer peripheral surface of the disk 11, the lower part of which projects below the lower shell edge. The projecting part of the disk 11 is provided with a zero, or other similar, marker 21, and the indicator markings of the scale 20 are so located that, when the device is at rest (Figs. 2 and 3) the zero mark of the scale 20 registers with the zero mark 21 on the disk 11. The graduations of the scale 20 preferably indicate inch-pounds pressure. It will, therefore, be seen that, in tightening a nut, bolt, or the like, and when rotation of the shell 10 relative to the disk 11 takes place in clockwise direction, the position of the scale 20 with respect to the zero mark 21 will indicate the torque condition in inch-pounds pressure. The operator, knowing the inch-pounds pressure that each particular nut, bolt or the like will stand before breakage, can avoid the latter condition by observing the scale 20 and by discontinuing the application of pressure to the work when the scale 20 indicates that the desired pressure has been reached. Likewise, successive nuts, etc., may be set up to the same desired extent.

The structure shown in Figs. 4 to 6, inclusive, is quite similar to that of Figs. 1 to 3, inclusive, except that it employs a spiral, clock-type torsion spring 22. Specifically, this device includes an outer shell 23 similar to the shell 10, except that it is of less depth. It also includes a disk 24 similar to the disk 11. The outer shell 24 has an integral, axial, squared extension 25, and the disk 24 has a similar extension 26, which extensions serve the purposes of the shanks 15 and 12 of the previously-described form. The disk 24 is further provided with an axial shaft-like member 27 extending upwardly from its inner face with its inner end rotatably received in a socket 28 formed in the inner wall of the outer shell 23 on the axis thereof. In this way, like in the first form, the shell and disk are mounted and guided for relative rotation without the tendency of the parts to bind upon each other.

Relative rotation of the shells 23 and 24 is opposed by the spring 22, one end of which is secured to the disk shaft 27 by a screw 29 and the other end is secured to the inner wall of the shell 23 by a screw 30. The spring 22 holds the parts against axial separation.

In the use of the structure shown in Figs. 4 to 6, inclusive, the same practice is carried out as in connection with the form already described. The spring 22 opposes relative rotation between the shell 23 and disk 24 and its initial tension is overcome only when the work (nut, bolt or the like) offers sufficient resistance. The extent of relative rotation between these parts, as measured in inch-pounds pressure, is indicated by the scale 31 on the outer surface of the shell 23 and the zero marker 32 on the disk 24.

I believe that the operation of my invention, as well as the advantages hereinabove stated, will be understood from the foregoing description. The structures shown and described may well serve the purpose of registering the force or torque applied through the wrench in tightening or loosening nuts, studs, bolts or the like. It may also be used, by employing suitable adapter devices (not shown), to measure the force or torque necessary to move any rotatable member in its bearing,—as, for example, a lathe spindle, or a crank shaft, or piston and connecting rod mountings. In other words, in the use of my invention, the fit of devices of this character may be readily determined and accurately adjusted.

It is to be understood that while I have shown two forms of devices embodying my invention, other changes in details and arrangements of parts may be resorted to without departing from the spirit and scope of my invention as defined by the claims that follow.

I claim:

1. In structure of the class described, a pair of relatively rotatable members, means on one of said members through which it is engaged with the work, means on the other of said members by which rotational movement may be applied thereto, both said means being so constructed and arranged that either of said members may be connected with the work with the other member adapted to have rotational movement applied thereto, permitting the structure as a whole to be used in an upright or an inverted condition, a torsion spring between said members and having one end positively connected to one of said members and the other end positively connected to the other of said members so that said spring yieldingly opposes relative rotation of said members in one direction in either the upright or inverted position of the structure, and means associated with said members for visually indicating the extent of relative rotation thereof as opposed by said spring.

2. In structure of the class described, an annular shell member having an open end and a closed end, a comparatively shallow disk member rotatably mounted in the open end of said shell member with a part of its periphery projecting within and a part projecting outside said shell member, a torsion spring connected at one end to said shell member and at its other end to said disk member, an outwardly projecting axial connecting element non-rotatably associated with said disk member, an outwardly projecting axial connecting element non-rotatably associated with the closed end of said shell member, both said connecting elements being constructed and arranged to be similarly engaged either with the work or with an object for applying rotational movement thereto, and cooperating scale means on said shell member and the outside part of said disk member adapted when either of said elements is engaged with the work to indicate pressure applied to effect relative rotation between said shell and disk members in opposition to said spring.

3. In structure of the class described, an annular shell member having an open end and a closed end; a comparatively shallow disk member rotatably mounted in the open end of said shell member with a part of its periphery projecting within and a part projecting outside said shell member, axial rotational guide support means between said shell and disk members, a torsion spring connected at one end to said shell member and at its opposite end to said disk member so as to yieldably oppose relative rotation of said members, similar means on both said members for engaging the same either with the work or with an object adapted to apply rotational movement thereto, and registering scale means on the open end edge portion of said shell and on the outer projecting part of said disk member.

4. In structure of the class described, an annular shell member having an open end and a closed end, a comparatively shallow disk member rotatably mounted in the open end of said shell member with a part of its periphery projecting within and a part projecting outside said shell member, a torsion spring connected at one end to said shell member and at its other end to said disk member for opposing relative rotation between said members, an exterior element extending axially from the closed end of said shell member, an exterior element extending axially from said disk member, both said elements being constructed and arranged for connection with the work or with an object for applying rotational movement thereto, rotatably engaged guide means carried by said members in axial alignment with said elements, and cooperating scale means on the exposed part of said disk member and on the exterior open end portion of said shell member.

HERMAN W. ZIMMERMAN.